United States Patent

Higurashi

[11] Patent Number: 5,970,204
[45] Date of Patent: Oct. 19, 1999

[54] METHOD AND APPARATUS FOR RECORDING TIME CODE DATA

[75] Inventor: Seiji Higurashi, Tokyo, Japan

[73] Assignee: Victor Company of Japan, Ltd., Yokohama, Japan

[21] Appl. No.: 08/877,194

[22] Filed: Jun. 17, 1997

[30] Foreign Application Priority Data

Jun. 17, 1996 [JP] Japan .................................. 8-155548

[51] Int. Cl.⁶ .............................. H04N 5/91; H04N 5/93
[52] U.S. Cl. ................................................ 386/65; 386/57
[58] Field of Search ................................ 386/65, 46, 57, 386/1, 52, 4, 69; 360/72.2; H04N 5/91, 5/93

[56] References Cited

U.S. PATENT DOCUMENTS 4,777,537 10/1988 Ueno et al. ................................ 386/96

*Primary Examiner*—Robert Chevalier
*Attorney, Agent, or Firm*—Pollock, Vande Sande & Amernick

[57] ABSTRACT

An information signal is recorded on a recording medium along tracks on the recording medium. Time code data is added to the information signal before the information signal is recorded on the recording medium. A data piece is provided in the time code data added to the information signal. The data piece represents a relation between frames related to the information signal and the tracks on the recording medium.

8 Claims, 3 Drawing Sheets

METHOD AND APPARATUS FOR RECORDING TIME CODE DATA

BACKGROUND OF THE INVENTION

1. Field of the Invention

This invention relates to a method of recording time code data. This invention also relates to an apparatus for recording time code data.

2. Description of the Related Art

Time-information representing data of a given code is referred to as time code data or time code information. In some VTR's (video tape recorders), time code data is periodically added to or superimposed on a video signal, and the time-code-added video signal is recorded on a magnetic tape. Generally, time code data is used as an indication of absolute time related to each frame represented by a video signal. The time code data can also be used in recognizing absolute positions of segments of the video signal on the magnetic tape. Furthermore, the time code data can be used as a reference for providing synchronization when video signals reproduced from different magnetic tapes are edited into a single video signal.

Different words or different states of time code data are assigned to respective frames represented by a video signal. The time code data is incremented by "1" each time a frame represented by the video signal is replaced by a next frame. Accordingly, the time code data indicates an order number of every frame related to the video signal.

A known helical-scan digital VTR is able to record a digital signal on a magnetic tape at a data rate of 14.1 Mbps. During the recording of the digital signal, 60 slant tracks are formed on the magnetic tape per second. The known digital VTR can reproduce a digital signal from a magnetic tape at a data rate of 14.1 Mbps or a data rate smaller than 14.1 Mbps. For example, either a data rate of 4.6 Mbps or a data rate of 2 Mbps is set as the smaller data rate. It should be noted that the reproduction of a digital signal at a data rate of 4.6 Mbps corresponds to ⅓-speed playback while the reproduction at 2 Mbps corresponds to ⅐-speed playback.

In conceivable digital broadcasting, a source digital signal of video information and audio information has a bit rate of 4.6 Mbps, and the source digital signal is compressed into a second digital signal having a bit rate of 13.8 Mbps before the second digital signal is broadcasted. In this case, a program represented by the source digital signal is transmitted in one third of a normal time. It is assumed that the received second digital signal has been recorded by a digital VTR. When the second digital signal is reproduced at a speed equal to one third of the recording speed, the source digital signal which has a bit rate of 4.6 Mbps is properly recovered.

As previously explained, in the known digital VTR, during the recording of a digital video signal, 60 slant tracks are formed on a magnetic tape per second. In the case where a digital video signal to be recorded has a frame frequency of 30 Hz, every frame represented by the digital video signal is assigned to a pair of two neighboring tracks. In this case, time code data representing a same value (a same number) corresponds to two neighboring tracks. During high-speed playback, it is possible to search for desired absolute time, that is, the position of a desired 1-frame-corresponding segment of the digital video signal on the magnetic tape, by referring to the reproduced time code data.

It is assumed that a source digital video signal with a frame frequency of 30 Hz is compressed into a second digital video signal having three times the original bit rate, and the second digital video signal is recorded by the known digital VTR. In this case, three frames represented by the source digital video signal are assigned to two tracks, and hence time code data representing a same value (a same number) does not correspond to two neighboring tracks. Thus, during high-speed playback, it tends to be difficult to search for the position of a desired 1-frame-corresponding segment of the second digital video signal on the magnetic tape by referring to the reproduced time code data in the normal way.

SUMMARY OF THE INVENTION

It is a first object of this invention to provide a method of recording time code data which enables accurate recovery of time information regardless of the frame rate of a recorded signal to which the time code data is added.

It is a second object of this invention to provide an apparatus for recording time code data which enables accurate recovery of time information regardless of the frame rate of a recorded signal to which the time code data is added.

A first aspect of this invention provides a method comprising the steps of recording an information signal on a recording medium along tracks on the recording medium; adding time code data to the information signal before the information signal is recorded on the recording medium; and providing a data piece in the time code data added to the information signal, the data piece representing a relation between frames related to the information signal and the tracks on the recording medium.

A second aspect of this invention is based on the first aspect thereof, and provides a method wherein the relation indicates an assignment of the frames to the tracks.

A third aspect of this invention provides a method comprising the steps of recording an information signal on a recording medium along tracks on the recording medium, the information signal having 1-frame-corresponding segments; adding time code data to the information signal before the information signal is recorded on the recording medium; and providing a data piece in the time code data added to the information signal, the data piece representing a relation between the 1-frame-corresponding segments of the information signal and the tracks on the recording medium.

A fourth aspect of this invention is based on the third aspect thereof, and provides a method wherein the relation indicates an assignment of the 1-frame-corresponding segments to the tracks.

A fifth aspect of this invention provides an apparatus comprising first means for recording an information signal on a recording medium along tracks on the recording medium; second means for adding time code data to the information signal before the information signal is recorded on the recording medium by the first means; and third means for providing a data piece in the time code data added to the information signal, the data piece representing a relation between frames related to the information signal and the tracks on the recording medium.

A sixth aspect of this invention is based on the fifth aspect thereof, and provides an apparatus wherein the relation indicates an assignment of the frames to the tracks.

A seventh aspect of this invention provides an apparatus comprising first means for recording an information signal on a recording medium along tracks on the recording medium, the information signal having 1-frame-corresponding segments; second means for adding time code data to the information signal before the information signal is recorded on the recording medium by the first means; and third means for providing a data piece in the time code data added to the information signal, the data piece representing a relation between the 1-frame-corresponding segments of the information signal and the tracks on the recording medium.

An eighth aspect of this invention is based on the seventh aspect thereof, and provides an apparatus wherein the relation indicates an assignment of the 1-frame-corresponding segments to the tracks.

DESCRIPTION OF THE PREFERRED EMBODIMENT

Figure 1:
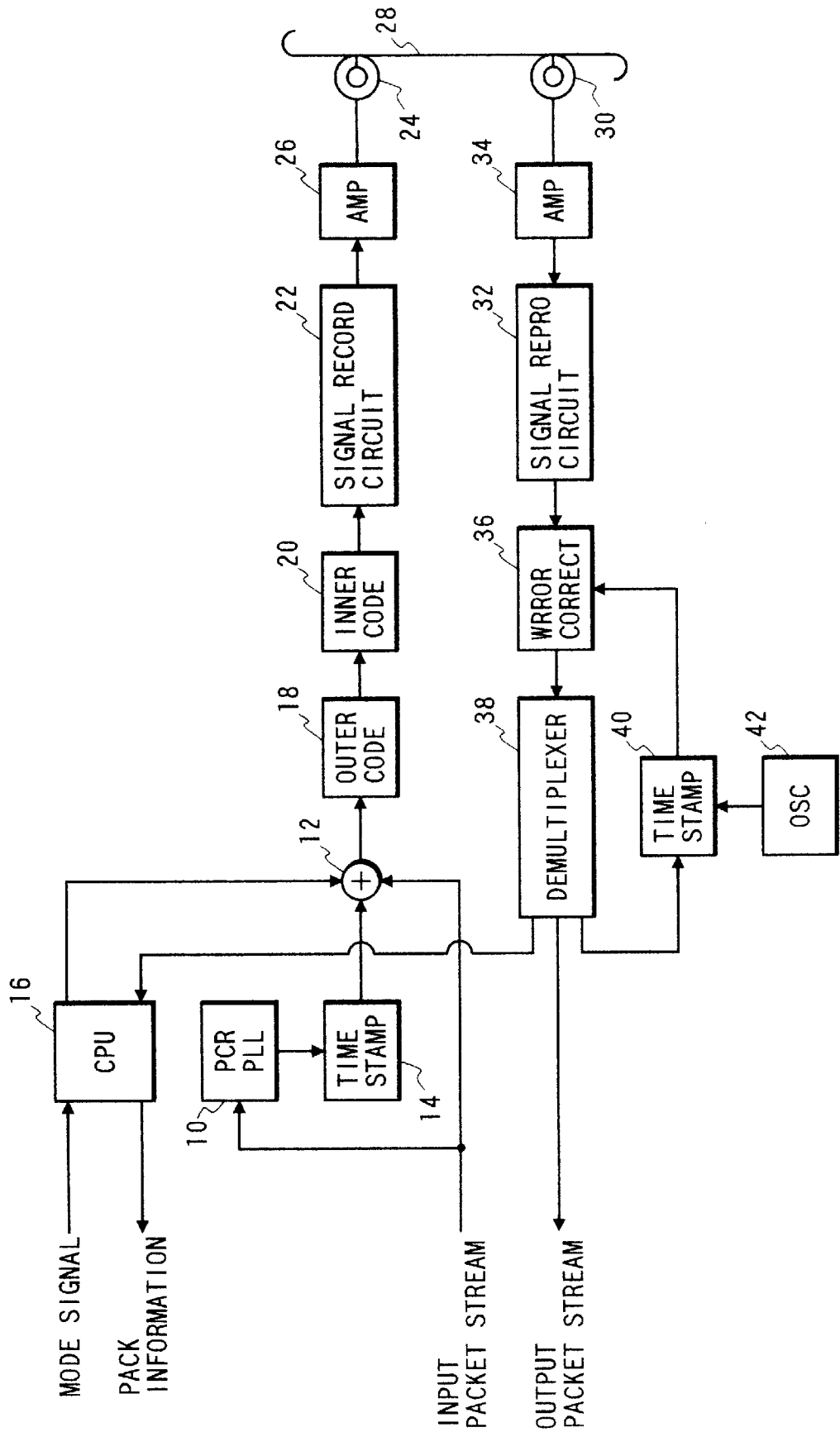
FIG. 1 is block diagram of a digital-signal recording and reproducing system according to an embodiment of this invention.

FIG. 1 shows a digital-signal recording and reproducing system (a digital VTR) according to an embodiment of this invention. The system of FIG. 1 handles a stream of packets of video data and audio data, such as an MPEG2 transport stream of packets of video data and audio data. Here, MPEG2 is short for "Moving Picture Image Coding Experts Group Phase 2".

A recording side of the system of FIG. 1 and a recording mode of operation of the system of FIG. 1 will be explained hereinafter.

With reference to FIG. 1, an input packet stream (for example, an input MPEG2 transport stream) is applied to a PCR PLL circuit 10 and an adder or a multiplexer 12. Here, PCR is short for "Program Clock Reference", and PLL is short for "Phase Locked Loop".

The PCR PLL circuit 10 has a section which extracts information of reference time from the header of each packet in the input stream. The extracted reference time information includes time stamp information and PCR information. The PCR PLL circuit 10 includes a local clock generator producing a clock signal having a frequency of, for example, about 27 MHz. The PCR PLL circuit 10 also includes a PLL by which the clock signal is locked to the reference time. The PCR PLL circuit 10 outputs the clock signal to a time stamp generator 14.

The time stamp generator 14 produces information of a time stamp in response to the clock signal fed from the PCR PLL circuit 10. The time stamp indicates the moment of the arrival of each packet. For example, the time stamp generator 14 includes a counter responsive to the clock signal. The time stamp generator 14 outputs the information of the time stamp to the multiplexer 12.

A CPU 16 is programmed to periodically and sequentially generate various packs of data which include a pack of time code data. The CPU 16 outputs the pack data to the multiplexer 12. The CPU 16 is programmed to update the time code data regarding "frame", "second", "minute", "hour", and "day" in response to, for example, internally-generated clock information.

The multiplexer (the adder) 12 combines or multiplexes the input packet stream, the time stamp information, and the pack data. The resultant output signal of the multiplexer 12 is fed to an outer-code generating circuit 18. The output signal of the multiplexer 12 will also be referred to as "the multiplexer output signal".

The signal fed from the multiplexer 12 to the outer-code generating circuit 18 is divided into data blocks also referred to as sync blocks. The outer-code generating circuit 18 generates an error correction code signal (an outer code signal) for every given number of data blocks assigned to one track. The outer-code generating circuit 18 adds the outer code signal to a portion of the output signal of the multiplexer 12 which corresponds to one track. The outer-code generating circuit 18 outputs the resultant combination of the outer code signal and the multiplexer output signal to an inner-code generating circuit 20.

The inner-code generating circuit 20 generates a parity signal (an inner code signal) in response to every data block or every data unit of the output signal of the outer-code generating circuit 18. The inner-code generating circuit 20 outputs a combination of the multiplexer output signal, the outer code signal, and the inner code signal to a signal recording circuit 22.

The signal recording circuit 22 adds a sync signal and ID information to every data block of the output signal of the inner-code generating circuit 20, and subjects the addition-resultant signal to amplification and modulation for record. The signal recording circuit 22 outputs the modulation-resultant signal to a recording head assembly 24 via a recording amplifier 26. The recording head assembly 24 records the modulation-resultant signal on a magnetic tape 28.

A reproducing side of the system of FIG. 1 and a reproducing mode (a playback mode) of operation of the system of FIG. 1 will be explained hereinafter.

A reproducing head assembly 30 scans the magnetic tape 28 and reproduces a digital signal therefrom. The reproducing head assembly 30 outputs the reproduced digital signal to a signal reproducing circuit 32 via a reproducing amplifier 34.

The signal reproducing circuit 32 subjects the reproduced digital signal to demodulation. The demodulation-resultant signal is outputted from the signal reproducing circuit 32 to an error correction circuit 36. Errors in the output signal of the signal reproducing circuit 32 are corrected by the error correction circuit 36 in response to an outer code signal and an inner code signal in the output signal of the signal reproducing circuit 32. The error correction circuit 36 outputs the error-correction-resultant signal to a demultiplexer 38.

The demultiplexer 38 separates the output signal of the error correction circuit 36 into a packet stream (for example, an MPEG2 transport stream), time stamp information, and pack data. The demultiplexer 38 outputs the packet stream as a recovered packet stream or a reproduced packet stream. The demultiplexer 38 outputs the time stamp information to a time stamp circuit 40. The demultiplexer 38 outputs the pack data to the CPU 16.

A quartz crystal oscillator 42 outputs a clock signal to the time stamp circuit 40. The clock signal has a fixed frequency equal to, for example, about 27 MHz. The time stamp circuit 40 has a section for converting the form of the clock signal and thereby generating clock-based information which can be compared with the time stamp information. This section includes, for example, a counter. The time stamp circuit 40 also has a section for comparing the time stamp information and the clock-based information and thereby generating a memory control signal in response to a result of the comparison. The time stamp circuit 40 feeds the memory control signal to the error correction circuit 36.

The error correction circuit 36 includes a buffer memory from which the error-correction-resultant signal is outputted. The timing of outputting of the error-correction-resultant signal is controlled in response to the memory control signal fed from the time stamp circuit 40. This control is designed so that timings related to packets in the error-correction-resultant signal outputted from the error-correction circuit 36 will accurately correspond to the moments of the arrival of the packets respectively.

The CPU 16 is programmed to decode the pack data fed from the demultiplexer 38. The CPU 16 outputs a signal representing information derived from the pack data. For example, the signal of the pack information is outputted from the CPU 16 to a display (not shown) so that the pack information will be indicated on a given area of the screen of the display.

The recording head assembly 24, the reproducing head assembly 30, and the magnetic tape 28 will be further explained. For example, the recording head assembly 24 includes a pair of recording heads mounted on a rotary drum. The recording heads have different azimuth angles, respectively. The recording heads are opposed diametrically with respect to the rotary drum. For example, the reproducing head assembly 30 includes a pair of reproducing heads mounted on the rotary drum. The reproducing heads have different azimuth angles, respectively. The reproducing heads are opposed diametrically with respect to the rotary drum. The rotary drum is rotated by a motor at a predetermined constant speed equal to, for example, 30 rps or 29.97 rps. The magnetic tape 28 is wound on the rotary drum in an angular range slightly greater than 180 degrees. The magnetic tape 28 extends on the rotary drum along a part of a helix.

During the recording mode of operation of the system of FIG. 1, the recording head assembly 24 records the output signal of the recording amplifier 26 (the modulation-resultant signal) on the magnetic tape 28 along slant tracks arranged in an array. During the reproducing mode of the operation of the system of FIG. 1, the reproducing head assembly 24 scans the slant tracks on the magnetic tape 28 and thereby reproduces a digital signal therefrom.

Figure 2:
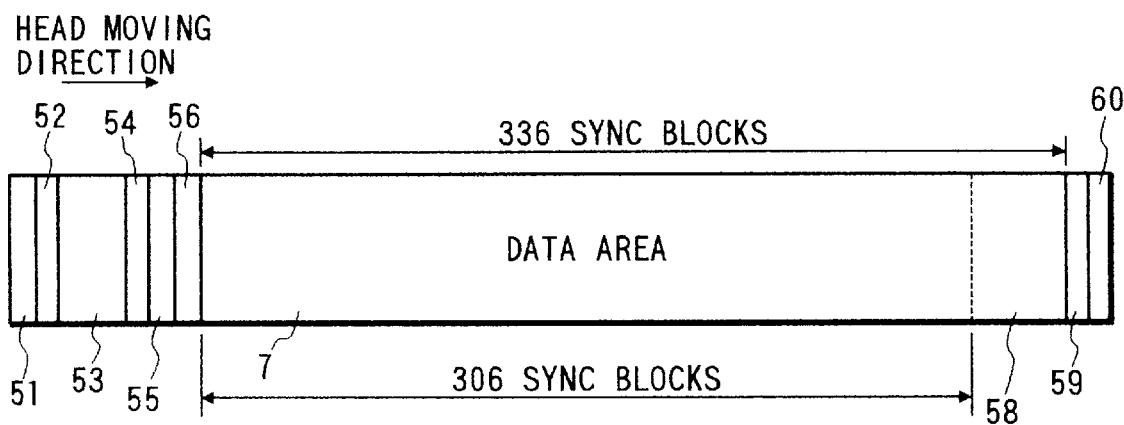
FIG. 2 is a diagram of a track format.

FIG. 2 shows the structure of one track on the magnetic tape 28. With reference to FIG. 2, one track has a sequence of a margin area 51, a preamble area 52, a subcode area 53, a postamble area 54, an IBG area 55, a preamble area 56, a data area 57, an error correction code area 58, a postamble area 59, and a margin area 60. The data area 57 and the error correction code area 58 compose a main data area. The data area 57 records 306 sync blocks representing a digital signal (normal data or special data). The error correction code area 58 records 30 sync blocks representing an outer error correction code signal (a C3 code signal or an outer code signal). The preamble area 52, the subcode area 53, and the postamble area 54 record preamble data, subcode data, and postamble data respectively. The IBG area 55 records IBG data providing an inter-block gap between a subcode data zone and a main data zone. The preamble area 56 and the postamble area 59 record preamble data and postamble data respectively.

Figure 3:
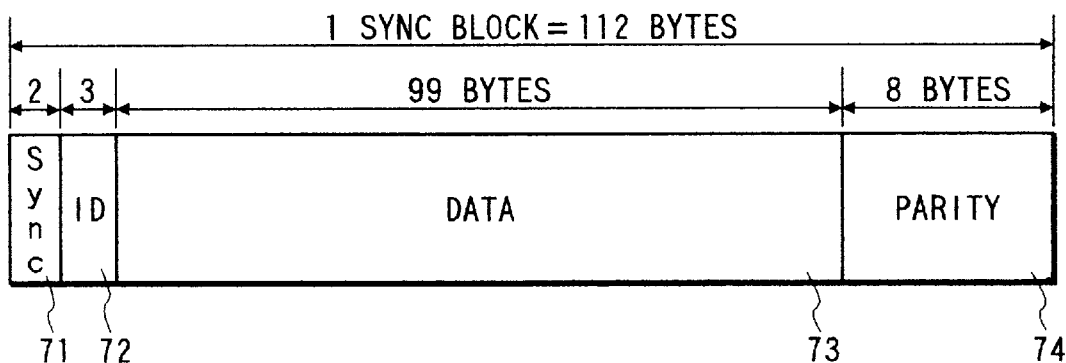
FIG. 3 is a diagram of a format of one sync block.

FIG. 3 shows an example of a format of one sync block. With reference to FIG. 3, one sync block corresponds to 112 bytes in capacity (size), and has a sequence of sub areas 71, 72, 73, and 74. The first sub area 71 has 2 bytes, and contains a sync signal. The second sub area 72 has 3 bytes, and contains address information. The address information is also referred to as the identification (ID) information. The third sub area 73 has 99 bytes, and contains various information pieces. The third sub area 73 is referred to as the data storing region. The fourth sub area 74 has 8 bytes, and contains parities for correcting an error or errors in the information represented by the other sub areas 71–73.

For example, a digital signal in a transport packet (TP) transmission system of MPEG2 (Moving Picture Experts Group 2) is handled as normal data or special data, and every 1-packet-corresponding segment of the digital signal is recorded on the data storing regions 73 of two sync blocks.

Figure 4:
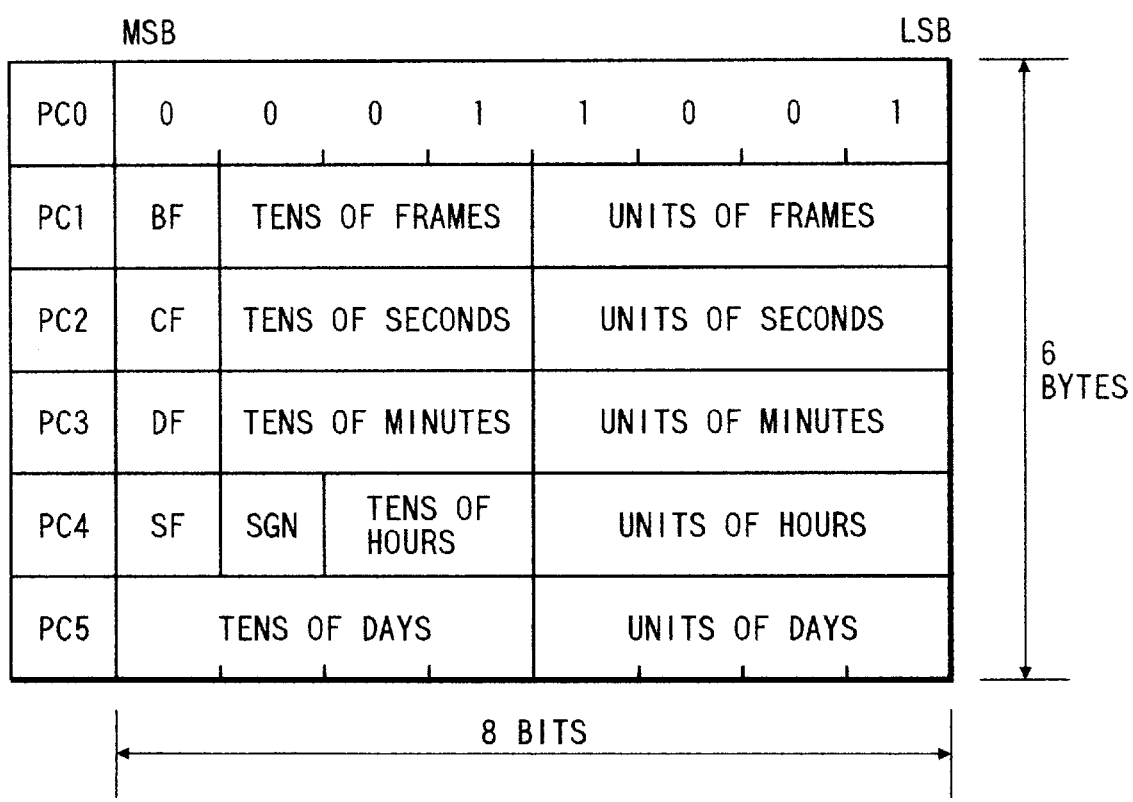
FIG. 4 is a diagram of a format of a pack of time code data.

As previously explained, packs of data generated by the CPU 16 includes a pack of time code data. As shown in FIG. 4, a pack of time code data has a capacity or a size corresponding to 6 bytes. A pack of time code data is recorded in the subcode area 53 or the data area 57 (see FIG. 2). Time code data in a pack indicates the position on the magnetic tape 28 at which the pack is recorded. The time code data is incremented by "1" each time a 1-frame-corresponding segment of a recorded signal is replaced by a next 1-frame-corresponding segment thereof. Accordingly, the time code data also indicates an order number of every 1-frame-corresponding segment of the recorded signal. It should be noted that 1-frame-corresponding segments of the input MPEG2 transport stream are defined on a time averaging basis.

Specifically, a pack of time code data has a first byte PC0, a second byte PC1, a third byte PC2, a fourth byte PC3, a fifth byte PC4, and a sixth byte PC5. The first byte PC0 is loaded with a fixed bit pattern "00011001" representing that the pack is a "time code pack". A blank flag BF, a continuity flag CF, a drop frame flag DF, and a scanning flag SF are located in the highest bits (MSB's) of the second byte PC1, the third byte PC2, the fourth byte PC3, and the fifth byte PC4, respectively. A sign flag SGN is located in the second highest bit of the fifth byte PC4.

The input packet stream with respect to the system of FIG. 1 is selected from among at least two types. The input packet stream of the first type is such that every frame related to the input packet stream (every 1-frame-corresponding segment of the input packet stream) is assigned to two neighboring tracks on the magnetic tape 28. Regarding the input packet stream of the first type, a change in the time code data per two tracks is equal to "1". The first type is also referred to as the normal type. The input packet stream of the second type is such that two neighboring tracks on the magnetic tape 28 correspond to more than or less than one frame related to the input packet stream (a 1-frame-corresponding segment of the input packet stream). Regarding the input packet stream of the second type, a change in the time code per two tracks differs from "1". For example, in the input packet stream of the second type, three frames (three 1-frame-corresponding signal segments) are assigned to two neighboring tracks. In this case, the second type is also referred to as the compressed type. As understood from the previous explanation, such a type of the input packet stream indicates the relation between frames related to a recorded digital signal (1-frame-corresponding segments of the recorded digital signal) and tracks on the magnetic tape 28.

With reference back to FIG. 1, the CPU 16 receives a mode signal from a suitable device which represents the type of the input packet stream. The CPU 16 is programmed to decide the state of the continuity flag CF in response to the mode signal. Specifically, the continuity flag CF is set to "0"

when the input packet stream is of the normal type (the first type). The continuity flag CF is set to "1" when the input packet stream is of the second type (for example, the compressed type). Thus, the continuity flag CF indicates the type of the input packet stream, that is, the relation between frames related to a recorded digital signal (1-frame-corresponding segments of the recorded digital signal) and tracks on the magnetic tape 28.

The CPU 16 is programmed to control the timings of the updating and the outputting of the time code data in response to the mode signal. This timing control is designed to maintain the correspondency between the time code data and the signal frame regardless of the type of the input packet stream.

The blank flag BF in FIG. 4 indicates whether or not packs are consecutively recorded on respective tracks from the start position on the magnetic tape 28, that is, whether a discontinuity is present or absent. The blank flag BF being "0" indicates the presence of a discontinuity. The blank flag BF being "1" indicates the absence of a discontinuity.

The drop frame flag DF in FIG. 4 depends on the frame frequency of video data in the input packet stream. When the frame frequency of video data is equal to 29.94 Hz, that is, when the video data is of the NTSC television system, the drop frame flag DF is set to "0" as an indication of a drop frame mode. When the frame frequency of video data is equal to 30 Hz, the drop frame flag DF is set to "1" as an indication of a non drop frame mode.

In the case where the frame frequency of video data is equal to 29.94 Hz, there occurs an error between time code data and actual time. In this case, correction on the drop frame mode is implemented according to the SMPTE time code standards or the EBU time code standards. Here, SMPTE is short for "Society of Motion Picture and Television Engineers", and EBU is short for "European Broadcasting Union".

The scanning flag SF in FIG. 4 indicates the scanning format of video data in the input packet stream. When the video data is of the interlace scanning format, the scanning flag SF is set to "0". When the video data is of the non-interlace scanning format (the progressive scanning format), the scanning flag SF is set to "1".

There is defined a starting point on the magnetic tape 28 which follows the starting end of the magnetic tape 28 by a predetermined interval corresponding to a predetermined lapse of time. The time code data corresponding to the starting point is set to an initial value. The time code data corresponding to a tape portion before the starting point is set to negative values (minus values). The time code data corresponding to a tape portion after the starting point is set to positive values (plus values).

The sign flag SGN in FIG. 4 indicates the sign of a value represented by the time code data. The sign flag SGN is set to "0" when the value represented by the time code data is positive (plus). The sign flag SGN is set to "1" when the value represented by the time code data is negative (minus).

The second byte PC1 in FIG. 4 indicates a frame order number. Specifically, the second highest bit to the fourth highest bit of the second byte PC1 indicate a "frame" value in a digit place of "10", that is, the second lowest digit place, according to decimal notation. The fifth highest bit to the lowest bit (LSB) of the second byte PC1 indicate a "frame" value in a digit place of "1", that is, the lowest digit place, according to decimal notation.

The third byte PC2 in FIG. 4 indicates time information related to "second". Specifically, the second highest bit to the fourth highest bit of the third byte PC2 indicate a "second" value in a digit place of "10", that is, the second lowest digit place, according to decimal notation. The fifth highest bit to the lowest bit (LSB) of the third byte PC2 indicate a "second" value in a digit place of "1", that is, the lowest digit place, according to decimal notation.

The fourth byte PC3 in FIG. 4 indicates time information related to "minute". Specifically, the second highest bit to the fourth highest bit of the fourth byte PC3 indicate a "minute" value in a digit place of "10", that is, the second lowest digit place, according to decimal notation. The fifth highest bit to the lowest bit (LSB) of the fourth byte PC3 indicate a "minute" value in a digit place of "1", that is, the lowest digit place, according to decimal notation.

The fifth byte PC4 in FIG. 4 indicates time information related to "hour". Specifically, the third highest bit and the fourth highest bit of the fifth byte PC4 indicate a "hour" value in a digit place of "10", that is, the second lowest digit place, according to decimal notation. The fifth highest bit to the lowest bit (LSB) of the fifth byte PC4 indicate a "hour" value in a digit place of "1", that is, the lowest digit place, according to decimal notation.

The sixth byte PC5 in FIG. 4 indicates time information related to "day". Specifically, the first highest bit (MSB) to the fourth highest bit of the sixth byte PC5 indicate a "day" value in a digit place of "10", that is, the second lowest digit place, according to decimal notation. The fifth highest bit to the lowest bit (LSB) of the sixth byte PC5 indicate a "day" value in a digit place of "1", that is, the lowest digit place, according to decimal notation.

As previously explained, during the playback mode of operation of the system of FIG. 1, the CPU 16 decodes the pack data fed from the demultiplexer 38. The decoding-resultant pack data includes the recovered continuity flag CF. The CPU 16 recognizes or detects the state of the recovered continuity flag CF. When the recovered continuity flag CF is "0", it is decided that the digital signal recorded on the magnetic tape 28 is of the normal type (the first type). When the recovered continuity flag CF is "1", it is decided that the digital signal recorded on the magnetic tape 28 is of the second type (for example, the compression type). As previously explained, the type of the recorded digital signal means the relation between frames related to the recorded digital signal (1-frame-corresponding segments of the recorded digital signal) and the tracks on the magnetic tape 28. The CPU 16 outputs a signal containing information representing the state of the recovered continuity flag CF.

During a fast playback mode or a search mode of operation of the system of FIG. 1, a main controller including a microcomputer calculates a desired accessed position on the magnetic tape 28 according to predetermined equations which have coefficients depending on the information of the state of the recovered continuity flag CF. Thus, the information of the state of the recovered continuity flag CF is used in searching for the desired accessed position on the magnetic tape 28. The use of the CF state information makes it possible to quickly and accurately search for the desired accessed position on the magnetic tape 28 regardless of the type of the digital signal recorded on the magnetic tape 28.

The embodiment of this invention may be modified as follows. In the case where video data of plural different programs is recorded on the magnetic tape 28, the time code data may be modified to indicate time information of each of the programs.

The continuity flag CF may be set to "1" when the input packet stream is of a type such that effective information intermittently occurs at a predetermined constant period. An example of such an information signal is video data handled in a time lapse VTR. For example, a time lapse procedure with a factor of 8 records only 1-frame-corresponding segments of video data which are spaced by intervals of 7 frames. In this case, the time code data is periodically changed by "8".

A modification of the embodiment of this invention assigns every 1-frame-corresponding segment of the input packet stream to 10 tracks on the magnetic tape 28 in the case where the input packet stream is of the normal type.

What is claimed is:

1. A method comprising the steps of:

recording an information signal on a recording medium along tracks on the recording medium;

adding time code data to the information signal before the information signal is recorded on the recording medium; and providing a data piece in the time code data added to the information signal, the data piece representing whether a value indicated by the time code data changes serially or nonserially for every given number of the tracks.

2. A method as recited in claim 1, wherein in cases where the information signal recorded on the recording medium includes one of a compressed video signal and a discontinuous video signal, the data piece represents that the value indicated by the time code data changes nonserially for every given number of the tracks.

3. A method comprising the steps of:

recording an information signal on a recording medium along tracks on the recording medium, the information signal having 1-frame corresponding segments;

adding time code data to the information signal before the information signal is recorded on the recording medium, the time code data indicating a value which changes by 1 for each of the 1-frame corresponding segments of the information signal; and providing a data piece in the time code data added to the information signal, the data piece representing whether the value indicated by the time code data changes serially or nonserially for every given number of the tracks.

4. A method as recited in claim 3, wherein in cases where the information signal recorded on the recording medium includes one of a compressed video signal and a discontinuous video signal, the data piece represents that the value indicated by the time code data changes nonserially for every given number of the tracks.

5. An apparatus comprising:

first means for recording an information signal on a recording medium along tracks on the recording medium;

second means for adding time code data to the information signal before the information signal is recorded on the recording medium by the first means; and third means for providing a data piece in the time code data added to the information signal, the data piece representing whether a value indicated by the time code data changes serially or nonserially for every given number of the tracks.

6. An apparatus as recited in claim 5, wherein in cases where the information signal recorded on the recording medium includes one of a compressed video signal and a discontinuous video signal, the data piece represents that the value indicated by the time code data changes nonserially for every given number of the tracks.

7. An apparatus comprising:

first means for recording an information signal on a recording medium along tracks on the recording medium, the information signal having 1-frame-corresponding segments;

second means for adding time code data to the information signal before the information signal is recorded on the recording medium, the time code data indicating a value which changes by 1 for each of the 1-frame-corresponding segments of the information signal; and third means for providing a data piece in the time code data added to the information signal, the data piece representing whether the value indicated by the time code data changes serially or nonserially for every given number of the tracks.

8. An apparatus as recited in claim 7, wherein in cases where the information signal recorded on the recording medium includes one of a compressed video signal and a discontinuous video signal, the data piece represents that the value indicated by the time code data changes nonserially for every given number of the tracks.

* * * * *